US011555622B2

United States Patent
Chikkala et al.

(10) Patent No.: US 11,555,622 B2
(45) Date of Patent: Jan. 17, 2023

(54) INTELLIGENT CONTEXT-BASED CONTROL OF AIR FLOW

(71) Applicant: International Business Machines Corporation, Armonk, NY (US)

(72) Inventors: Ravithej Chikkala, Austin, TX (US); Su Liu, Austin, TX (US); Hamid Majdabadi, Ottawa (CA); Manjunath Ravi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 16/720,503

(22) Filed: Dec. 19, 2019

(65) Prior Publication Data

US 2021/0190350 A1 Jun. 24, 2021

(51) Int. Cl.
| | | |
|---|---|---|
| *F24F 11/30* | (2018.01) | |
| *G05B 13/02* | (2006.01) | |
| *F24F 11/56* | (2018.01) | |
| *F24F 11/64* | (2018.01) | |
| *F24F 11/72* | (2018.01) | |
| *F24F 11/80* | (2018.01) | |
| *F24F 11/65* | (2018.01) | |

(Continued)

(52) U.S. Cl.
CPC .............. *F24F 11/30* (2018.01); *F24F 11/56* (2018.01); *F24F 11/64* (2018.01); *F24F 11/65* (2018.01); *F24F 11/72* (2018.01); *F24F 11/80* (2018.01); *G05B 13/0265* (2013.01); *F24F 2120/12* (2018.01); *F24F 2120/14* (2018.01)

(58) Field of Classification Search
CPC .. F24F 11/30; F24F 11/64; F24F 11/65; F24F 11/80; F24F 11/72; F24F 11/74; F24F 11/79; F24F 2120/14; F24F 2120/12; G05B 13/0265
See application file for complete search history.

(56) References Cited

U.S. PATENT DOCUMENTS 6,659,360 B1 12/2003 Schaefer et al.
8,190,301 B2 5/2012 Voysey
(Continued)

OTHER PUBLICATIONS

Koretsune et al. "Human adaptive control strategy for multiple air conditioners." 2006 IEEE International Conference on Systems, Man and Cybernetics. vol. 3. IEEE, 2006, 6 pages.
(Continued)

*Primary Examiner* — Mohammad Ali
*Assistant Examiner* — Vincent W Chang
(74) *Attorney, Agent, or Firm* — Edell, Shapiro & Finnan, LLC (57) ABSTRACT

A computer system provides intelligent context-based control of air flow. An identity of a user and a location of the user within an area that includes one or more vents associated with a climate control system are identified. User preferences are determined based on the identity of the user. Characteristics of air flow in the area are adjusted based on the user preferences the user and the location of the user, wherein the characteristics of the air flow comprise one or more from a group of: a direction, and a flow rate. Embodiments of the present invention further include a method and program product for providing intelligent context-based control of air flow in substantially the same manner described above.

18 Claims, 5 Drawing Sheets

(51) Int. Cl.
    *F24F 120/14*        (2018.01)
    *F24F 120/12*        (2018.01)

(56)            References Cited

U.S. PATENT DOCUMENTS

| | | | |
|---|---|---|---|
| 9,589,455 | B2 | 3/2017 | Nakagawa |
| 9,669,569 | B2 | 6/2017 | Cathcart et al. |
| 10,917,259 | B1* | 2/2021 | Chein .................. H04L 12/282 |
| 2008/0003938 | A1 | 1/2008 | Baruschke et al. |
| 2013/0037252 | A1 | 2/2013 | Major et al. |
| 2013/0211669 | A1 | 8/2013 | DePetro |
| 2013/0243240 | A1* | 9/2013 | Marks ..................... F24F 11/63 |
| | | | 382/103 |
| 2014/0192197 | A1 | 7/2014 | Hanko et al. |
| 2017/0180294 | A1* | 6/2017 | Milligan ................. H04L 51/16 |
| 2018/0031265 | A1* | 2/2018 | Janniello ................. F24F 11/74 |
| 2019/0101306 | A1* | 4/2019 | Giorgi ..................... F24F 11/74 |
| 2019/0234632 | A1* | 8/2019 | Reeder .................... F24F 11/74 |
| 2019/0353378 | A1* | 11/2019 | Ramamurti ............. F24F 11/30 |
| 2020/0217550 | A1* | 7/2020 | Boyd ...................... F24F 11/64 |

OTHER PUBLICATIONS

Federspiel et al., "User-adaptable comfort control for HVAC systems," in Journal of Dynamic Systems, Measurement, and Control, vol. 116, Sep. 1994, pp. 474-487, 8 pages.
Feldmeier et al., "Personalized HVAC control system." 2010 Internet of Things (IOT). IEEE, 2010, 8 pages.

\* cited by examiner

INTELLIGENT CONTEXT-BASED CONTROL OF AIR FLOW

BACKGROUND

1. Technical Field

Present invention embodiments relate to controlling air flow in climate-controlled areas, and more specifically, to the intelligent context-based control of air flow.

2. Discussion of the Related Art

A climate control system regulates aspects of air in an environment. Often referred to as heating, ventilation, and air conditioning (HVAC) systems, climate control systems may perform various other functions in addition to heating and cooling of air, such as filtering particulates from air, exchanging or replacing air in a space, and modifying the humidity of air. Some climate control solutions provide a degree of customization, changing settings based on the time of day or the presence or absence of humans in the climate-controlled space. However, such systems lack the ability to satisfy a user's specific preferences with regard to air flow.

SUMMARY

According to one embodiment of the present invention, a computer system provides intelligent context-based control of air flow. An identity of a user and a location of the user within an area that includes one or more vents associated with a climate control system are identified. User preferences are determined based on the identity of the user. Characteristics of air flow in the area are adjusted based on the user preferences the user and the location of the user, wherein the characteristics of the air flow comprise one or more from a group of: a direction, and a flow rate. Embodiments of the present invention further include a method and program product for providing intelligent context-based control of air flow in substantially the same manner described above.

BRIEF DESCRIPTION OF THE DRAWINGS

Generally, like reference numerals in the various figures are utilized to designate like components.

DETAILED DESCRIPTION

Present invention embodiments relate to controlling air flow in climate-controlled areas, and more specifically, to the intelligent context-based control of air flow. Conventional approaches to controlling air flow utilize simple rules-based techniques, such as activating an air conditioner according to a schedule or in response to a user's smart device entering a predefined geofence. However, conventional approaches to controlling an area's air quality do not offer the ability to direct the flow of air within a space.

In contrast, present invention embodiments control characteristics of air flow within an area by combining controllable air vents with motion tracking techniques to direct air toward or away from specific portions of a climate-controlled space. In particular, by controlling the direction and/or flowrate of air output by a vent, air flow can be directed toward or away from a person based on factors such as the current context and the person's preferences. For example, a user may prefer to have cool air directed toward him during the summer, and heated air to be directed away from him in the winter. Contextual information can be identified and processed to provide a fine degree of personalization; for example, a user may provide a default setting specifying that cool air should be directed away from her, but may prefer cool air to be directed toward her for a few minutes when she first comes inside from a jog.

By controlling the flow of air within a climate-controlled area, present invention embodiments may alleviate health conditions of users, such as sinus issues, allergies, asthma, and respiratory infections. Moreover, controlling the direction and/or flowrate of air can result in a more efficient climate control system, as a user's perception of temperature can be adjusted more rapidly and without necessarily having to raise or lower the temperature of an entire room.

Thus, present invention embodiments enable a highly-customizable control of air flow based on user preferences and contexts. User preferences can be manually provided, or machine learning techniques may be employed to learn a user's preferences for various contexts over time. When compatible systems are provided in a variety of locations, such as residences, offices, and restaurants, a user's air flow preferences can be satisfied as the user travels from one location to another.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
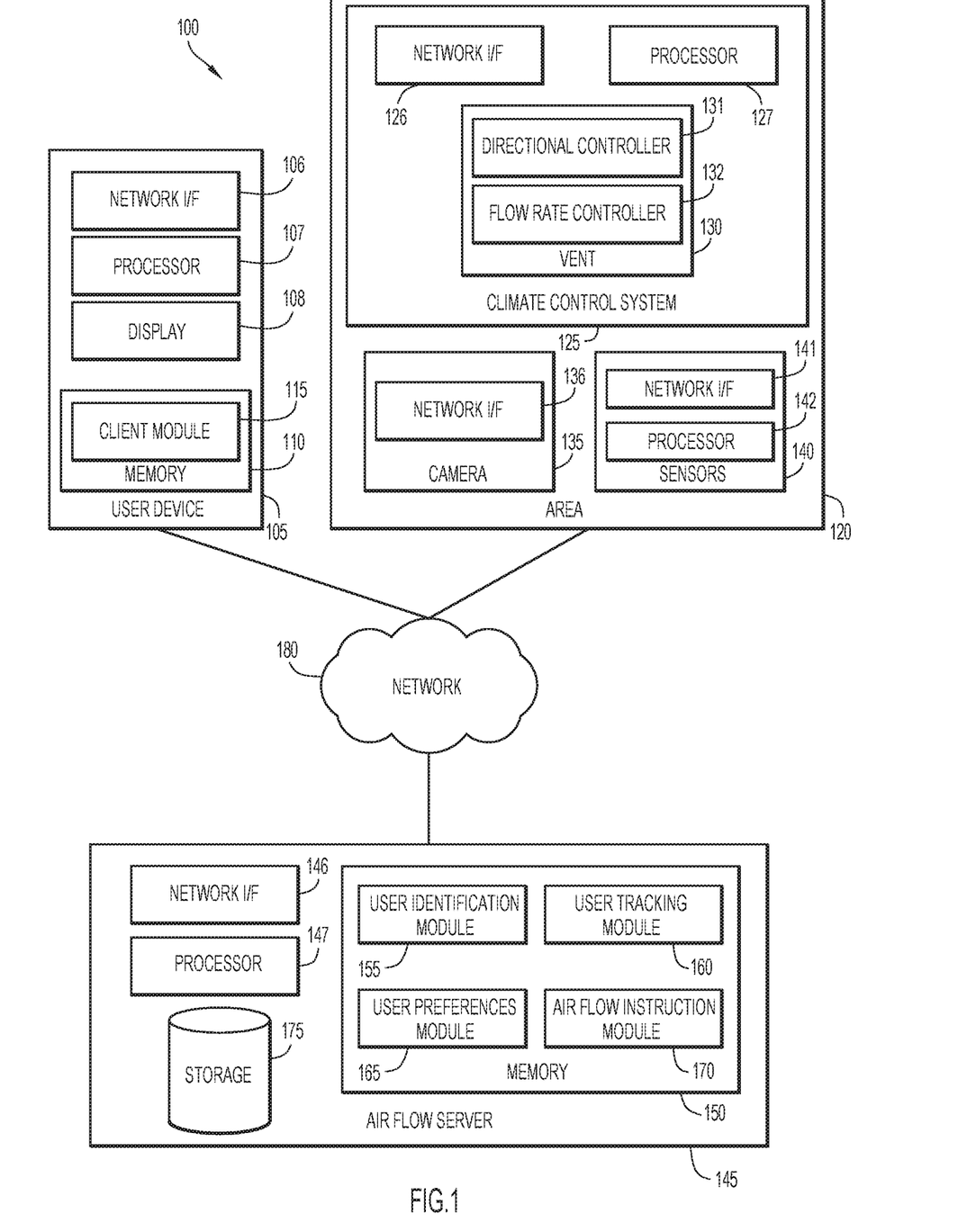
FIG. 1 is a block diagram depicting a computing environment for providing intelligent context-based control of air flow in accordance with an embodiment of the present invention.

Present invention embodiments will now be described in detail with reference to the Figures. FIG. 1 is a block diagram depicting a computing environment 100 for providing intelligent context-based control of air flow in accordance with an embodiment of the present invention. As depicted, computing environment 100 includes a user device 105, an air flow server 145, an area 120, and a network 180. It is to be understood that the functional division among components of computing environment 100 have been chosen for purposes of explaining present invention embodiments and is not to be construed as a limiting example.

User device 105 includes a network interface (I/F) 106, at least one processor 107, a display 108, and memory 110. Memory 110 may include a client module 115. User device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of user device 105 to send and receive data over a network, such as network 180. In general, a user of user device 105 may access, via client module 115, air flow server 145 to provide air flow preferences or other information. Additionally or alternatively, a user of user device 105 may access climate control system 125 to manually control one or more aspects of air in area 120, including temperature, humidity, and air flow settings. User device 105 may include internal and external hardware components, as depicted and described in further detail with respect to FIG. 5.

Display 108 may include any electronic device capable of presenting information in a visual form. For example, display 108 may be a liquid crystal display (LCD), a cathode ray tube (CRT) display, a light-emitting diode (LED) display, an electronic ink display, and the like. Information relating to a user's preferences and air flow settings may be presented to a user of user device 105 via display 108. For example, a user may review his or her user preferences, may add, remove, and/or modify preferences, and may review a current, previous, or scheduled condition of the air in area 120.

Client module 115 may include one or more modules or units to perform various functions of present invention embodiments described below. Client module 115 may be implemented by any combination of any quantity of software and/or hardware modules or units, and may reside within memory 110 of user device 105 for execution by a processor, such as processor 107.

Client module 115 enables a user to provide input regarding the user's air flow preferences and other information. User preferences may include one or more of: a direction of air output by vents, a flow rate of air output by vents, a temperature of air, a humidity of air, an air quality (e.g., a particulate matter (PM) value, such as $PM_{10}$ or $PM_{2.5}$), and the like. An air direction preference may specify a direction that is either toward or away from the user's person. In some embodiments, the direction of air that is output by a vent may include a particular location within area 120. A flow rate may include a predefined flow rate, such as "low," "medium," "high," etc., or may include a specified mass or volumetric flow rate for a vent or vents (e.g., in kg/s or m³/s, etc.). A user may provide schedule-based or context-based air flow preferences.

A user of user device 105 may also interact with client module 115 in order to provide context-based user preferences. A context-based user preference may include a preference that is applied when a particular contextual condition is satisfied. A user may provide a user preference based on the user's currently-worn apparel or an activity of the user. For example, a user may prefer for air to be directed toward their person unless they are sitting next to a fireplace or wearing a short-sleeved t-shirt.

Area 120 includes a climate control system 125, one or more cameras 135, and one or more sensors 140. In general, area 120 may include any indoor, partially-indoor, or outdoor environment that is serviced by climate control system 125. Climate control system 125 includes a network interface (I/F) 126, at least one processor 127, and at least one vent 130. Climate control system 125 may include any heating, ventilation, and air conditioning (HVAC) system or other system that can modify aspects of air, including temperature, humidity, and air quality. While air is referenced in example embodiments herein, it should be appreciated that present invention embodiments can extend to any fluid, including human-breathable fluids (e.g., pure oxygen, heliox, etc.) and/or other fluids (e.g., water, nitrogen, noble gases, etc.). Climate control system 125 can receive instructions (e.g., from user device 105 and/or air flow server 145) via network interface 126, which are processed via processor 127 to cause climate control system 125 to change air temperature, humidity, quality, direction, and/or flow rate.

Climate control system 125 includes at least one vent 130 for outputting air to area 120. Each vent 130 may include a directional controller 131 and a flow rate controller 132 for controlling the direction and/or flow rate of air output by vent 130. Air flows to vent 130 via one or more ducts so that vent 130 outputs air that has been processed by climate control system 125. Air that is output by vent 130 is provided to area 120.

Directional controller 131 and/or flow rate controller 132 may include motorized elements that are controllable by processor 127 (and/or another processor associated with vent 130) to mechanically alter the shape or configuration of vent 130 in order to change the direction or flow rate of air output by vent 130. Directional controller 131 may include one or more adjustable grills or blades, which may be provided in layers to divert the flow of air into a particular direction. For example, one layer of blades may be angled such that air is diverted at an angle upward or downward, and another layer of blades may be angled such that air is diverted to one side or the other, thus enabling the flow of air to be directed to specific portions of area 120. Flow rate controller 132 may include a valve or other regulator to adjust the flow rate of air passing through vent 130.

Camera 135 may include any device for capturing image data, including still photography and/or videography. Camera 135 may include a network interface (I/F) 136 for transmitting image data to air flow server 145 for further processing. One or more cameras 135 may be provided in area 120 as needed to ensure capture of user activity within area 120.

Sensor 140 may include any sensor for capturing motion data in area 120. Sensor 140 includes a network interface (I/F) 141 and at least one processor 142. In some embodiments, sensor 140 may include an ultrasound or infrared motion detector. Sensor 140 may emit electromagnetic or sound waves and analyze, via processor 142, echo metrics corresponding to the emitted waves in order to determine the position and/or change of position of objects, including users, within area 120. In some embodiments, the light or sound waves emitted by sensor 140 are above or below the human threshold of sensation (e.g., ultrasonic waves, infrared waves, etc.). Thus, sensor 140 may utilize conventional or other echolocation techniques to observe the position and/or motion of users within area 120. One or more sensors 140 may be provided in area 120 to ensure capture of user activity within area 120 and to obtain two-dimensional or three-dimensional positions of users within area 120.

Air flow server 145 may include a network interface 146, at least one processor 147, memory 150, and storage 175. Memory 150 may include a user identification module 155, a user tracking module 160, a user preferences module 165, and an air flow instruction module 170. In various embodiments of the present invention, air flow server 145 may include a laptop computer, a tablet computer, a netbook computer, a personal computer (PC), a desktop computer, a personal digital assistant (PDA), a smart phone, or any programmable electronic device capable of executing computer readable program instructions. Network interface 146 enables components of air flow server 145 to send and receive data over a network, such as network 180. In general, air flow server 145 generates, processes, and stores information relating to the context-based control of air flow, including user identity, location, and preference information, contextual information, and the like. Air flow server 145 may be co-located in proximity to area 120 or may be provided at an off-site location.

User identification module 155, user tracking module 160, user preferences module 165, and air flow instruction module 170 may include one or more modules or units to perform various functions of present invention embodiments. User identification module 155, user tracking module 160, user preferences module 165, and air flow instruction module 170 may be implemented by any combination of any quantity of software and/or hardware modules or units, and may reside within memory 150 of air flow server 145 for execution by a processor, such as processor 147.

User identification module 155 may process image data captured by camera 135 using conventional or other image processing techniques in order to identify a user. Thus, user identification module 155 applies facial recognition or other approaches to identify a user in area 120 based on facial characteristics or other features of the user. In some embodiments, rather than rely on image processing, user identification module 155 identifies the presence of a user in area 120 based on other data, such as an indication from a radio frequency identifier (RFID) device or other mobile device (e.g., a smartphone) associated with a user. For example, area 120 may include a wireless access point, and user identification module 155 may identify a user's presence in response to the user's smartphone connecting to the wireless access point.

User tracking module 160 performs people localization to track a user's location within area 120. User tracking module 160 may track a user's location by processing data collected by sensors 140. In some embodiments, current data collected from sensors 140 is compared to baseline values of area 120 to identify changes. For example, a user's body will reflect waves emitted from sensor 140 which enable the user's position in area 120 to be detected when compared to the baseline values. Additionally or alternatively, user tracking module 160 may analyze image data collected from camera 135 to identify a position of a user within area 120.

User preferences module 165 may generate and maintain user preferences relating to air flow and other aspects (e.g., temperature, humidity, quality, etc.). A user of user device 105 may input user preferences via client module 115, which are received by user preferences module 165, associated with the particular user, and stored, e.g., in storage 175, for later access. In some embodiments, user preferences module 165 utilizes conventional or other machine learning techniques to learn user preferences and/or to associate user preferences with particular contexts. In particular, user preferences module 165 may analyze implicit or explicit user feedback to learn user preferences. A user may explicitly provide feedback via client module 115 to indicate approval or disapproval of a particular air setting. Implicit user feedback can be obtained based on user actions; for example, if a user manually modifies a setting of climate control system 125 (including a setting of vent 130), user preferences module 165 can learn that the user prefers the user-provided setting over the previous setting. Additionally or alternatively, image data of a user can be processed using sentiment analysis, and audio data can similarly be processed using conversational analysis, to determine whether a user is exhibiting a positive or negative reaction to a particular setting of climate control system 125.

User preferences module 165 may use conventional or other machine learning techniques to associate particular user preferences with contexts, such as a time of day or year, a user's apparel, a user's position within area 120, user activity, and the like. For example, user preferences module 165 may determine that when a user is using an exercise device, the user may prefer to be cooled down, and may accordingly generate user preferences that instruct vent 130 to direct cool air toward the user during and/or after exercise. User apparel contexts can be based on the warmth of apparel; for example, a user who is wearing a suit jacket or trousers may be warmer than a user wearing a short-sleeved shirt or shorts. In some embodiments, a machine learning model is provided that utilizes a vector space model in which contexts are encoded as feature vectors according to conventional or other techniques; the feature vectors may be modified over time based on user feedback, and user preferences may be determined based on the feature vectors. The machine learning model(s) employed in present invention embodiments may include any conventional or other artificial intelligence models, such as a neural network (e.g., a recurrent neural network), a supervised or unsupervised machine learning model, a reinforcement learning model, and the like. Inputs to a model may include any user activity and/or contextual information associated with a user, including user habits, explicit and implicit user feedback, and the like. Outputs may include one or more user preferences for particular characteristics of air flow.

In some embodiments, user preferences module 165 obtains user preferences and contexts using a machine learning process that includes detection and prediction of a user's activities through a plurality of devices (e.g., internet of things devices) and/or user profiles for modifying the characteristics of air flow. The contexts may include, but are not limited to, correlating appointment cancellations (e.g, a doctor's appointment), moving closer to or further from area 120 (which can include a private or public area), a preferred desk position at work in relation to the air flow, vehicle temperature settings, and any other trackable sensors or data that can be collected and auto-aggregated into a dynamic preference generated to convey the preferred air flow characteristics to any supported air circulation system (e.g, climate control system 125). Additionally, the user preferences may be detected and reserved or suggested from activities or actions, such as appropriate seat selection in a meeting room or cinema, etc.

Air flow instruction module 170 may transmit instructions to climate control system 125 based on user location within area 120, user preferences, and/or contextual information. In particular, air flow instruction module 170 provides instructions to modify characteristics of air flow including one or more of the temperature of air in area 120, the humidity of air in area 120, the quality of air in area 120, the direction of air output by vent 130 in area 120, and/or the flow rate of air output by vent 130 in area 120.

Storage 175 may include any non-volatile storage media known in the art. For example, storage 175 can be implemented with a tape library, optical library, one or more independent hard disk drives, or multiple hard disk drives in a redundant array of independent disks (RAID). Similarly, data in storage 175 may conform to any suitable storage architecture known in the art, such as a file, a relational database, an object-oriented database, and/or one or more tables. In some embodiments, storage 175 may store data relating to the context-based control of air flow, including user identity data, user location data, user preferences (including user-provided preferences and learned preferences), contextual information, and the like.

Network 180 may include a local area network (LAN), a wide area network (WAN) such as the Internet, or a combination of the two, and includes wired, wireless, or fiber optic connections. In general, network 180 can be any combination of connections and protocols known in the art that will support communications between user device 105, climate control system 125, camera 135, sensors 140, and air flow server 145 via their respective network interfaces in accordance with embodiments of the present invention.

Figure 2:
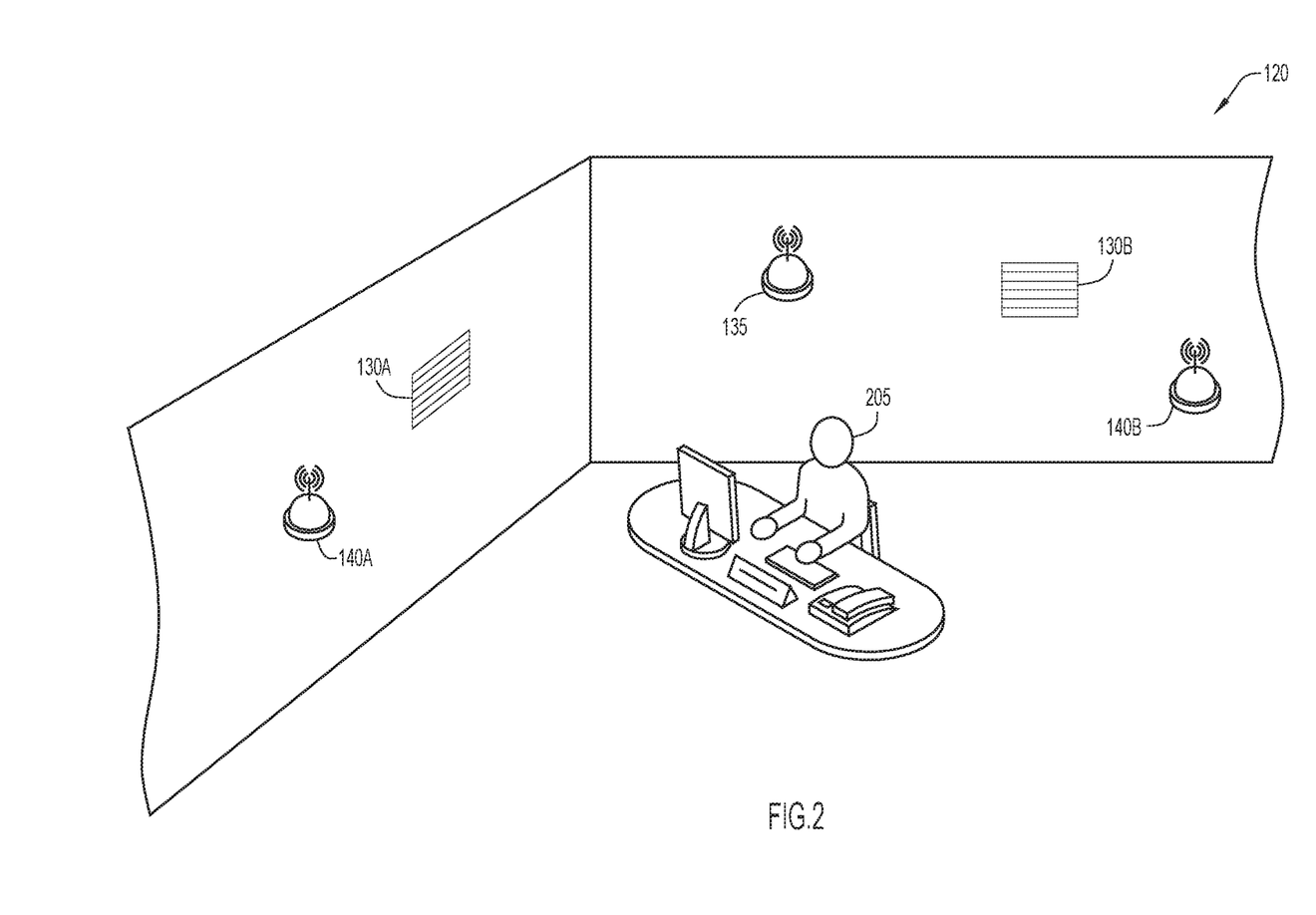
FIG. 2 is an example of an area provided with a climate control system in accordance with an embodiment of the present invention.

FIG. 2 is an example of an area 120 provided with a climate control system in accordance with an embodiment of the present invention. As depicted, area 120 includes a plurality of vents 130A and 130B, a camera 135, a plurality of sensors 140A and 140B, and a user 205. It should be appreciated that both the number of vents 130A and 130B and sensors 140A and 140B, as well as the positioning of vents 130A and 130B, sensors 140A and 140B, and camera 135, are presented as an example of one present invention embodiment, and do not imply any limitations with regard to the environments in which different embodiments may be implemented.

Vents 130A and 130B may be hydraulically connected to a climate control system, such as climate control system 125, in order to provide air to area 120 that has been processed according to user preferences. Camera 135 may capture image data for determining an identity of user 205, and camera 135 and/or sensors 140A and 140B may identify the position of user 205 within area 120. Based on the position of user 205 within area 120, and the user preferences of user 205, the flow of air that is output by vents 130A and/or 130B may be modified. For example, vent 130A and/or 130B may direct air toward or away from user 205, or may increase or decrease the flow rate of air.

Figure 3:
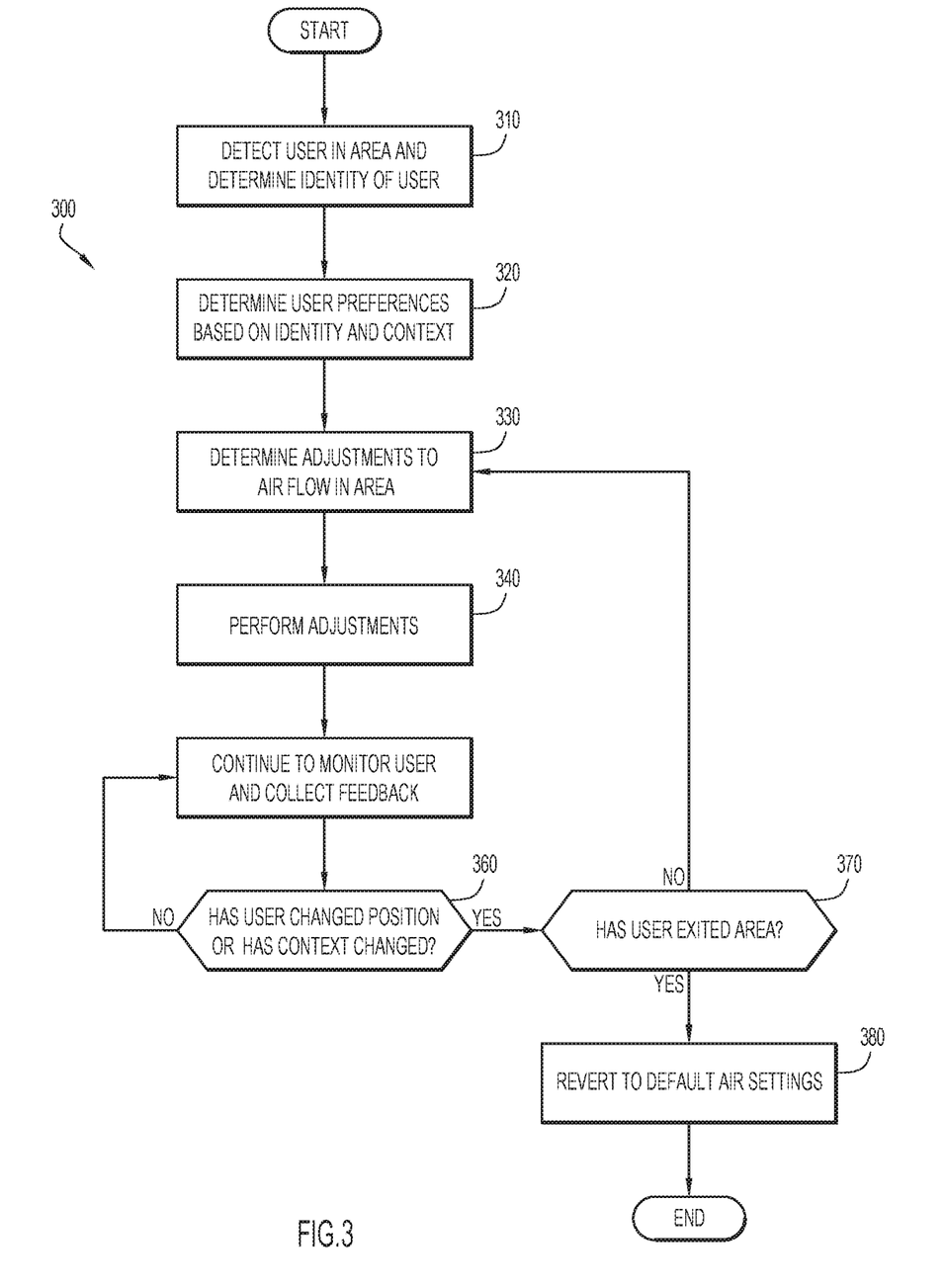
FIG. 3 is a flow chart depicting a method of providing intelligent context-based control of air flow in accordance with an embodiment of the present invention.

FIG. 3 is a flow chart depicting a method 300 of providing intelligent context-based control of air flow in accordance with an embodiment of the present invention.

A user is detected in an area and the identity of the user is determined at operation 310. The user's location in area 120 may be determined by sensors 140 and/or by processing image data of area 120 captured by camera 135. Additionally, the identity of the user may be determined by processing image data captured from camera 135 using facial recognition techniques. In some embodiments, the identity of the user is determined based on an identification device that broadcasts or otherwise indicates information associated with the identity of the user, such as a smartphone, wireless fob, and the like.

User preferences are determined based on the identity of the user and other contextual information at operation 320. Once user identification module 155 identifies a user, user preferences module 165 retrieves the user's preferences, which can include an air temperature preference, an air humidity preference, and air quality preference, an air direction preference, and/or an air flow rate preference. User preferences may further be based on conditions, such as schedule-based conditions or contextual conditions; for example, one user preference may be selected in the summer and another user preference may instead be applied in the winter.

Adjustments to air flow in the area are determined at operation 330. Climate control system 125 may adjust features of the air that is output into area 120, and vent 130 may be adjusted to modify the direction and/or flow rate of are that is output. Air flow instruction module 170 may analyze user preferences together with contextual information collected from area 120 in order to determine the adjustments. In some embodiments, when two or more users who occupy area 120 have conflicting preferences, air flow instruction module 170 may determine adjustments that are mostly likely to satisfy each user's preferences. For example, an air temperature may be averaged, or a single adjustment to the direction of air flow may direct air away from one user and toward another user. In some embodiments, when conflicting user preferences cannot be resolved, air flow instruction module 170 may not indicate any adjustments, and the users may be receive a notification (e.g., via client module 115 of user device 105).

The determined adjustments are performed at operation 340. Air flow instruction module 170 may transmit instructions indicating the determined adjustments to climate control system 125 for execution. Climate control system 125 may also makes the adjustments to vent 130.

Monitoring of the user continues and feedback is collected at operation 350. Data is collected from area 120 via camera 135 and/or sensors 140, and explicit user feedback may be collected and transmitted by client module 115 of user device 105.

Operation 360 determines whether the user has changed position or whether a context has changed. Image data collected by camera 135 and motion data collected by sensors 140 may be processed by user tracking module 160 to determine whether the user has changed position or if a current context has changed (e.g., if a user begins a new activity, changes the user's apparel, etc.). If changes are detected and the user has not exited the area, the new position of the user and/or context are processed at operation 330 to determine additional adjustments. For example, if a user prefers for air to be directed toward the user, and the user changes seats in a room, air flow may be redirected toward the user's new location.

If the user has changed position and operation 370 determines that the user has exited the area, then climate control system 125 may revert to default or previous settings at operation 380. For example, if a user departs from area 120, the temperature may be raised or lowered to a default setting to provide energy savings.

Figure 4:
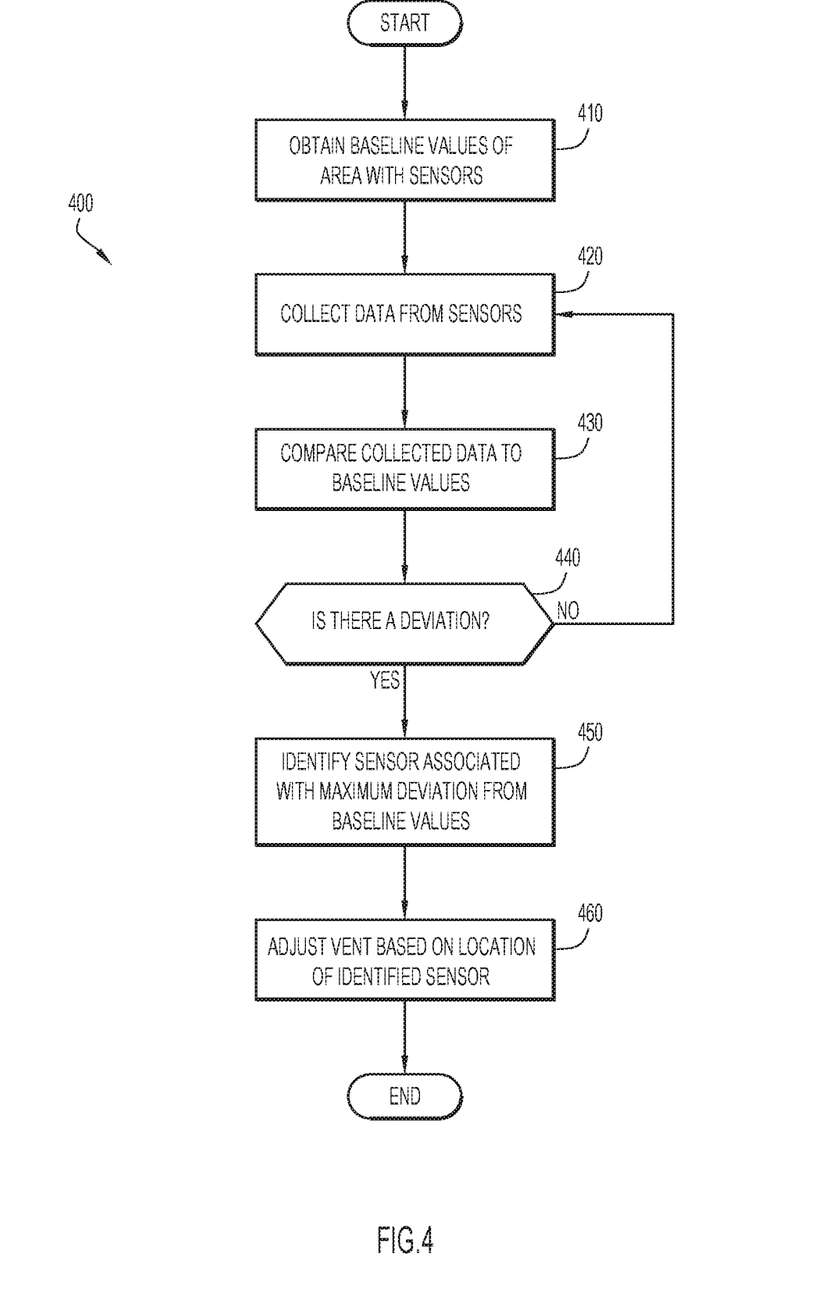
FIG. 4 is a flow chart depicting a method of detecting a user to provide intelligent context-based control of air flow in accordance with an embodiment of the present invention.

FIG. 4 is a flow chart depicting a method 400 of detecting a user to provide intelligent context-based control of air flow in accordance with an embodiment of the present invention.

Baseline values of an area are obtained with sensors at operation 410. Sensors 140 may emit electromagnetic and/or acoustic waves that are reflected based on the shape of area 120 and positioning of objects within area 120; by collecting and analyzing these returned waves when there is no activity within area 120, baseline values for the area can be determined. In order to obtain baseline values, it may be necessary to prevent motion in area 120 for a minimum amount of time. For example, all humans and pets may need to vacate area 120 for several minutes during the initial baselining.

Data is collected from sensors at operation 420, and the collected data is compared to the baseline values at operation 430. Any departures from baseline values may correspond to motion within area 120.

Operation 440 determines whether there is a deviation between the collected data and the baseline values. In some embodiments, the difference between collected data and baseline values must be beyond a predetermined threshold value and/or must occur for a minimum amount of time in order to be considered an actionable deviation. For example, if a user is moving around in area 120 and therefore causing deviations in multiple sensors 140, adjustments to the air flow may not be made until the user settles in a particular place for a minimum amount of time (e.g., one minute). In some embodiments, a deviation that occurs for beyond a threshold length of time may be learned as a new baseline value; for example, if a table is moved across the room, any deviations detected by sensors within range of the table might be learned as new baseline values.

If there is a deviation between the collected data and the baseline values, the sensor associated with the maximum deviation from baseline values is identified at operation 450. When a particular sensor 140 is experiencing a maximum deviation as compared to the other sensors, the sensor 140 may be the closest in proximity to a user and may accordingly represent the user's location.

One or more vents are adjusted based on the location of the identified sensor at operation 460. Climate control system 125 may adjust vent 130 to direct air toward or away from sensor 140 based on the preferences of an identified user.

Figure 5:
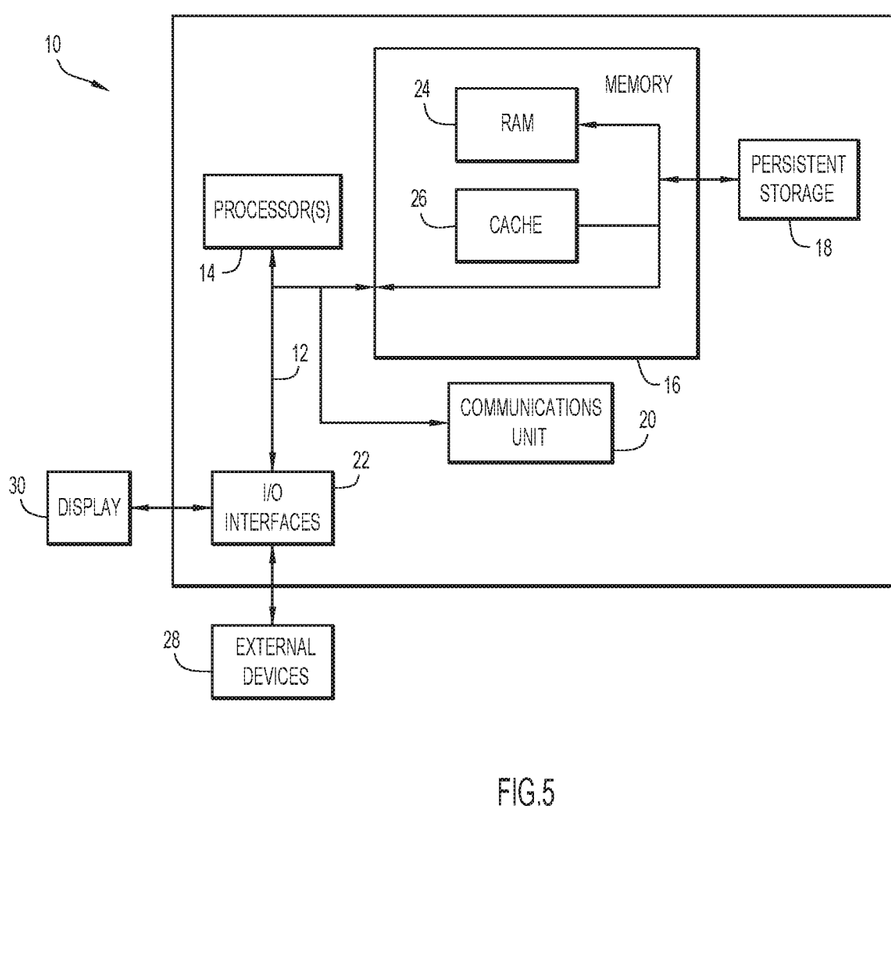
FIG. 5 is a block diagram depicting a computing device in accordance with an embodiment of the present invention.

FIG. 5 is a block diagram depicting components of a computer 10 suitable for executing the methods disclosed herein. Computer 10 may implement user device 105, climate control system 125, and/or air flow server 145 in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to intelligent context-based control of air flow (e.g., user preferences, user feedback data, machine learning model data, instructions for adjusting air flow and other air properties, etc.) may be stored within any conventional or other data structures (e.g., files, arrays, lists, stacks, queues, records, etc.) and may be stored in any desired storage unit (e.g., database, data or other repositories, queue, etc.). The data transmitted between user device 105, climate control system 125, and/or air flow server 145 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to intelligent context-based control of air flow (e.g., user preferences, user feedback data, machine learning model data, instructions for adjusting air flow and other air properties, etc.) may include any information provided to, or generated by, user device 105, climate control system 125, and/or air flow server 145. Data relating to intelligent context-based control of air flow may include any desired format and arrangement, and may include any quantity of any types of fields of any size to store any desired data. The data relating to intelligent context-based control of air flow may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to intelligent context-based control of air flow), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of providing intelligent context-based control of air flow.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, client module 115, user identification module 155, user tracking module 160, user preferences module 165, air flow instruction module 170, etc.). These systems may include any types of monitors and input devices (e.g., keyboard, mouse, voice recognition, etc.) to enter and/or view information.

It is to be understood that the software (e.g., communications software, server software, client module 115, user identification module 155, user tracking module 160, user preferences module 165, air flow instruction module 170, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, client module 115, user identification module 155, user tracking module 160, user preferences module 165, air flow instruction module 170, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to intelligent context-based control of air flow). The database system may be implemented by any number of any conventional or other databases, data stores or storage structures (e.g., files, databases, data structures, data or other repositories, etc.) to store information (e.g., data relating to intelligent context-based control of air flow). The database system may be included within or coupled to the server and/or client systems. The database systems and/or storage structures may be remote from or local to the computer or other processing systems, and may store any desired data (e.g., data relating to intelligent context-based control of air flow).

The present invention embodiments may employ any number of any type of user interface (e.g., Graphical User Interface (GUI), command-line, prompt, etc.) for obtaining or providing information (e.g., data relating to intelligent context-based control of air flow), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, providing a context-aware control of the flow of any fluid within an environment.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for controlling air flow based on context analysis, the computer-implemented method comprising:
   identifying, via one or more processors, an identity of a plurality of users and a location of the plurality of users within an area that includes one or more vents associated with a climate control system;
   determining, via the one or more processors, user preferences based on the identity of the plurality of users, wherein the user preferences are determined according to a machine learning model, and wherein implicit user feedback is processed by the machine learning model to adjust the user preferences;
   determining, via the one or more processors, a conflict between the user preferences of at least two different users;
   resolving, via the one or more processors, the conflict between the user preferences of the at least two different users, wherein resolving the conflict includes determining an adjustment to direct air away from a first user and toward a second user based on air temperature of the user preferences of the first user and the second user; and
   adjusting, via the one or more processors, characteristics of air flow in the area based on the determined adjustment to direct air away from the first user and toward the second user, the user preferences of the plurality of users and the location of the plurality of users, wherein the characteristics of the air flow comprise the air temperature and one or more from a group of: a direction, and a flow rate.

2. The computer-implemented method of claim 1, wherein the identity of the plurality of users is determined using facial recognition from captured images of the plurality of users.

3. The computer-implemented method of claim 1, wherein the user preferences further include one or more from a group of: an air direction preference, and an air flow rate preference.

4. The computer-implemented method of claim 1, wherein adjusting the characteristics of air flow is further based on contextual information, and wherein the contextual information includes one or more from a group of: a time of day context, a time of year context, a user apparel context, a user position context, and a user activity context.

5. The computer-implemented method of claim 1, wherein the area further includes one or more motion sensors, and wherein the location of the plurality of users is determined using the one or more motion sensors.

6. The computer-implemented method of claim 1, wherein the implicit user feedback is used to identify a positive or negative reaction to the characteristics of air flow, and wherein the implicit user feedback is obtained by one or more of: processing image data using sentiment analysis, and processing audio data using conversational analysis.

7. A computer system for controlling air flow based on context analysis, the computer system comprising:
   one or more computer processors;
   one or more computer readable storage media;
   program instructions stored on the one or more computer readable storage media for execution by at least one of the one or more computer processors, the program instructions comprising instructions to:
      identify an identity of a plurality of users and a location of the plurality of users within an area that includes one or more vents associated with a climate control system;
      determine user preferences based on the identity of the plurality of users, wherein the user preferences are determined according to a machine learning model, and wherein implicit user feedback is processed by the machine learning model to adjust the user preferences;
      determine a conflict between the user preferences of at least two different users;
      resolve the conflict between the user preferences of the at least two different users, wherein resolving the conflict includes determining an adjustment to direct air away from a first user and toward a second user based on air temperature of the user preferences of the first user and the second user; and
      adjust characteristics of air flow in the area based on the determined adjustment to direct air away from the first user and toward the second user, the user preferences of the plurality of users and the location of the plurality of users, wherein the characteristics of the air flow comprise the air temperature and one or more from a group of: a direction, and a flow rate.

8. The computer system of claim 7, wherein the identity of the plurality of users is determined using facial recognition from captured images of the plurality of users.

9. The computer system of claim 7, wherein the user preferences further include one or more from a group of: an air direction preference, and an air flow rate preference.

10. The computer system of claim 7, wherein adjusting the characteristics of air flow is further based on contextual information, and wherein the contextual information includes one or more from a group of: a time of day context, a time of year context, a user apparel context, a user position context, and a user activity context.

11. The computer system of claim 7, wherein the area further includes one or more motion sensors, and wherein the location of the plurality of users is determined using the one or more motion sensors.

12. The computer system of claim 7, wherein the implicit user feedback is used to identify a positive or negative reaction to the characteristics of air flow, and wherein the implicit user feedback is obtained by one or more of: processing image data using sentiment analysis, and processing audio data using conversational analysis.

13. A computer program product for controlling air flow based on context analysis, the computer program product comprising one or more computer readable storage media collectively having program instructions embodied therewith, the program instructions executable by a computer to cause the computer to:
   identify an identity of a plurality of users and a location of the plurality of users within an area that includes one or more vents associated with a climate control system;
   determine user preferences based on the identity of the plurality of users, wherein the user preferences are determined according to a machine learning model, and wherein implicit user feedback is processed by the machine learning model to adjust the user preferences;
   determine a conflict between the user preferences of at least two different users;
   resolve the conflict between the user preferences of the at least two different users, wherein resolving the conflict includes determining an adjustment to direct air away from a first user and toward a second user based on air temperature of the user preferences of the first user and the second user; and
   adjust characteristics of air flow in the area based on the determined adjustment to direct air away from the first user and toward the second user, the user preferences of the plurality of users and the location of the plurality of users, wherein the characteristics of the air flow comprise the air temperature and one or more from a group of: a direction, and a flow rate.

14. The computer program product of claim 13, wherein the identity of the plurality of users is determined using facial recognition from captured images of the plurality of users.

15. The computer program product of claim 13, wherein the user preferences further include one or more from a group of: an air direction preference, and an air flow rate preference.

16. The computer program product of claim 13, wherein adjusting the characteristics of air flow is further based on contextual information, and wherein the contextual information includes one or more from a group of: a time of day context, a time of year context, a user apparel context, a user position context, and a user activity context.

17. The computer program product of claim 13, wherein the area further includes one or more motion sensors, and wherein the location of the plurality of users is determined using the one or more motion sensors.

18. The computer program product of claim 13, wherein the implicit user feedback is used to identify a positive or negative reaction to the characteristics of air flow, and wherein the implicit user feedback is obtained by one or more of: processing image data using sentiment analysis, and processing audio data using conversational analysis.

* * * * *